United States Patent
Dhavale et al.

(10) Patent No.: US 9,424,301 B2
(45) Date of Patent: Aug. 23, 2016

(54) SYSTEM AND METHOD FOR NEGOTIATED TAKEOVER OF STORAGE OBJECTS

(71) Applicant: NETAPP, INC., Sunnyvale, CA (US)

(72) Inventors: Poonam Dhavale, Sunnyvale, CA (US); Manish Bhuwania, Sunnyvale, CA (US); Arun Ramachandran, Sunnyvale, CA (US); Herman M. Mutiso, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 460 days.

(21) Appl. No.: 14/088,196

(22) Filed: Nov. 22, 2013

(65) Prior Publication Data
US 2015/0149416 A1 May 28, 2015

(51) Int. Cl.
*G06F 17/30* (2006.01)
(52) U.S. Cl.
CPC .............................. *G06F 17/30348* (2013.01)
(58) Field of Classification Search
CPC . G06F 17/30348; G06F 3/0631; G06F 3/067
See application file for complete search history.

(56) References Cited

U.S. PATENT DOCUMENTS

| | | | | |
|---|---|---|---|---|
| 7,778,986 B2* | 8/2010 | Bish | ................ | G06F 17/30067 707/687 |
| 7,899,895 B2* | 3/2011 | Bish | .................... | G06F 3/0617 707/687 |
| 7,991,822 B2* | 8/2011 | Bish | ................ | G06F 17/30575 707/687 |
| 8,271,706 B2* | 9/2012 | Neemidge | ............. | G06F 3/0617 710/19 |
| 8,751,533 B1* | 6/2014 | Dhavale | ............... | G06F 3/0647 707/782 |
| 2012/0109919 A1* | 5/2012 | Park | .................... | G06F 11/2023 707/703 |

OTHER PUBLICATIONS

NetApp, Inc., "Clustered Data ONTAP® 8.2," High-Availability Configuration Guide May 2013, 108 pages.

* cited by examiner

*Primary Examiner* — Cheryl Lewis
(74) *Attorney, Agent, or Firm* — LeClairRyan, a Professional Corporation (57) ABSTRACT

A system and method of negotiated takeover of storage objects includes one or more processors, a storage controller, and memory coupled to the one or more processors. The memory stores a data structure that includes information about a plurality of storage objects manageable by the storage controller. The storage controller is configured to assume, one by one, current ownership of a first subset of the storage objects and assume, concurrently, current ownership of a second subset of the storage objects. The first subset of storage objects and the second subset of storage objects are currently owned by a second storage server coupled to the storage server. In some embodiments, current ownership of the first subset of storage objects is transferred by iteratively detecting a particular storage object from the first subset of the storage objects whose current ownership can be assumed and bringing the particular storage object online.

18 Claims, 4 Drawing Sheets

SYSTEM AND METHOD FOR NEGOTIATED TAKEOVER OF STORAGE OBJECTS

TECHNICAL FIELD

The present disclosure relates generally to computing systems, and more particularly to negotiated takeover of storage objects.

BACKGROUND

In cloud computing and other computing environments, access to storage devices is often provided by one or more storage controllers operating out of storage servers, computing devices, or nodes within the computing environment. Each of the storage controllers may be configured to operate in a client-server model that allows client devices or applications to send storage requests to the storage controllers. In this model the clients are typically coupled to the storage controllers over a computer network, such as a network link, a local area network (LAN), or a wide-area network. The clients typically send the storage requests to the storage controllers using application programming interface (API) calls, remote procedure calls, web services, and/or the like.

When a storage controller receives a storage request, it examines the storage request to identify a file, a block, or an extent that is to be accessed. These files, blocks, and extents are typically located in one or more storage devices coupled either directly to the storage controller or indirectly using a network. The storage devices may include disk drives, flash memories, storage arrays, and/or the like. The storage devices are typically organized using file systems composed of one or more volumes. The volumes, in turn, may be further organized into one or more aggregates or storage objects that may each be managed by the storage controller as a single logical group. Each of the storage objects may be assigned a storage unit identifier that may be used within storage requests to identify a desired storage object.

The storage servers and their storage controllers may be networked or otherwise connected together as a storage system. The presence of multiple storage servers and storage controllers within the storage system may provide for several advantages. For example, use of multiple storage servers and storage controllers may allow for flexibility in handling the load due to storage requests. Whenever one of the storage servers becomes busy, it may be possible to use one of the other storage servers in the storage system to handle some of the storage requests. As another example, the multiple storage servers and storage controllers provide redundancy in the storage system. Whenever one of the storage servers or storage controllers is unavailable, either due to failure or from being offline due to maintenance, the other storage servers and storage controllers may be able to handle storage requests that would otherwise be handled by the unavailable storage server or storage controller.

In order to support this load balancing and/or redundancy among the storage servers and storage controllers, the storage servers and storage controllers coordinate the management and handling of the storage objects they provide access to. This may include the storage servers and storage controllers managing the "ownership" of the storage objects, with the storage server and storage controller that have "ownership" of the storage object being responsible for handling the storage requests associated with the storage object. Thus, in order for handling of storage requests to be transferred from a first (source) storage server and storage controller to a second (target) storage server and storage controller, the "ownership" of the storage object is migrated or transferred to the target storage server and storage controller using a takeover operation.

The migration or takeover operation may be accomplished by copying the data from a source storage object owned by the source storage server and storage controller to a target storage object owned by the target storage server and storage controller. Using copy operations to transfer ownership may have several disadvantages. First, copy operations are typically time intensive, especially when large quantities of data are involved. Second, the copy operations may also consume resources such as network bandwidth and resources of the storage devices involved.

A better migration solution involves "zero-copy" migration. Zero-copy migration may be used in a distributed architecture where each of the storage servers and storage controllers have access to a shared pool of storage devices containing the storage objects being managed by the storage system. By sharing the storage devices between the storage servers and storage controllers, each of the storage servers and storage controllers may have its own access to each of the storage objects, no matter which of the storage devices is storing the storage object. In this scenario, migration of ownership from the source storage server and storage controller to the target storage server and storage controller involves changing the ownership from the source storage server and storage controller to the target storage server and storage controller. Once the ownership is changed, storage requests for the migrated storage object are then directed to the target storage server and storage controller for handling.

One possible arrangement for supporting zero-copy migration uses two storage servers organized as a high-availability (HA) pair. In a HA pair, the two storage servers and their respective storage controllers are coupled together using a network with a management or control layer and are both coupled to the storage devices where the storage objects are stored. As both of the storage servers and storage controllers operate, they both monitor the status of the other and exchange status and other management messages. The ownership of the storage object is changed along with the responsibility for handling storage requests associated with that storage object whenever a storage object is migrated from one of the storage servers and storage controllers to the other storage server and storage controller using a takeover operation. A migration, for example, may occur as a result of an unscheduled event, such as whenever one of the storage servers or storage controllers fails, or in a planned fashion, such as when one of the storage servers or storage controllers is taken offline during maintenance and/or update.

During a takeover operation, each of the storage objects whose ownership is being migrated becomes temporarily unavailable. The period of unavailability helps to avoid uncertainty in the handling of storage requests that may occur when the ownership of the corresponding storage object is being migrated. In practice, the unavailability often begins when the storage object is taken offline by the source storage server and storage controller. Ownership of the storage object is then changed to the target storage server and storage controller, after which the target storage server and storage controller bring the storage object back online. While a storage object is unavailable, storage requests made to that storage object are not handled and the storage system may refuse to accept them when they are made by a client.

In the situation where the source storage server or storage controller becomes unavailable due to an unplanned event, such as a device failure, the storage objects owned by the source storage server and storage controller typically become concurrently offline. This is because with the unavailability of the source storage server and storage controller there is no storage server or storage controller designated to handle the storage requests for those storage objects. These storage objects remain offline until the unavailability of the source storage server and source storage controller is detected, a target storage server and storage controller are selected, the ownership of the storage objects are migrated to the target storage server and storage controller, and the target storage server and storage controller bring the storage objects back online. This may result in a significant period of delay, even after the unavailability is detected. In some cases the delay caused by the concurrent migration of several storage objects may be up to a minute or longer.

In the situation where the source storage server or storage controller becomes unavailable due to a planned or negotiated event, such as for a scheduled upgrade or other maintenance, the detection time may be eliminated. The storage objects are also migrated from the source storage server and storage controller to the target storage server and storage controller. As in the unplanned case, the storage objects may be migrated all at the same time, but it would be helpful if the period of unavailability could be better managed.

Accordingly, it would be desirable to provide methods and systems for effectively and efficiently changing the ownership of storage objects.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

When a source storage server and storage controller and a target storage server and storage controller are organized to work together, such as in a high-availability (HA) pair, the planned migration or takeover of storage objects from the source storage server and controller to the target storage server and controller may be managed in a cooperative fashion using a two phase approach. In a first phase, storage objects, such as those that contain user data and/or user metadata, which are owned by the source storage server and storage controller are migrated one at a time. During each individual migration, the source storage server and storage controller take the storage object offline, change the current ownership to the target storage server and storage controller, and then notify the target storage server and storage controller that the storage object is being migrated. After receiving the notification, the target storage server and storage controller bring the storage object online and begin handling storage requests for the storage object. This continues until the source storage server and storage controller have migrated as many of the storage objects it owns as possible. In some cases, the source storage server and storage controller may divide up the storage objects and migrate them to more than one target storage server and storage controller. By migrating the storage objects one at a time, rather than all at the same time, the length of time any individual storage object is unavailable may be reduced. In some cases, individual storage objects may become unavailable for 30 seconds or less.

After the first phase completes, the planned migration then enters a second phase where any remaining storage objects owned by the source storage server and storage controller are taken offline by the source storage server and storage controller, so that they are concurrently offline, before the ownership is migrated to the target storage server and storage controller. The second phase is used to handle the migration of any of the storage objects that could not be handled by the first phase of the migration. This may occur, for example, with the storage objects that contain the boot record and/or other special metadata structures such as cluster configurations and corresponding logs that remain under control of the source storage server and storage controller until the source storage server and storage controller themselves go offline.

To support the change in ownership of the storage objects, a data structure associated with the storage objects may track two different types of ownership. Already mentioned is the current ownership, which contains an identifier of the storage server and storage controller that are currently responsible for handling storage requests for the storage object. A home ownership is also maintained, which contains an identifier of the storage server and storage controller to which the current ownership of the storage object is returned when that storage server and storage controller are able to handle storage requests for the storage object. For example, the current ownership may be returned to the home owner when a storage server and storage controller come back online after having gone offline previously and given up current ownership.

Figure 1:
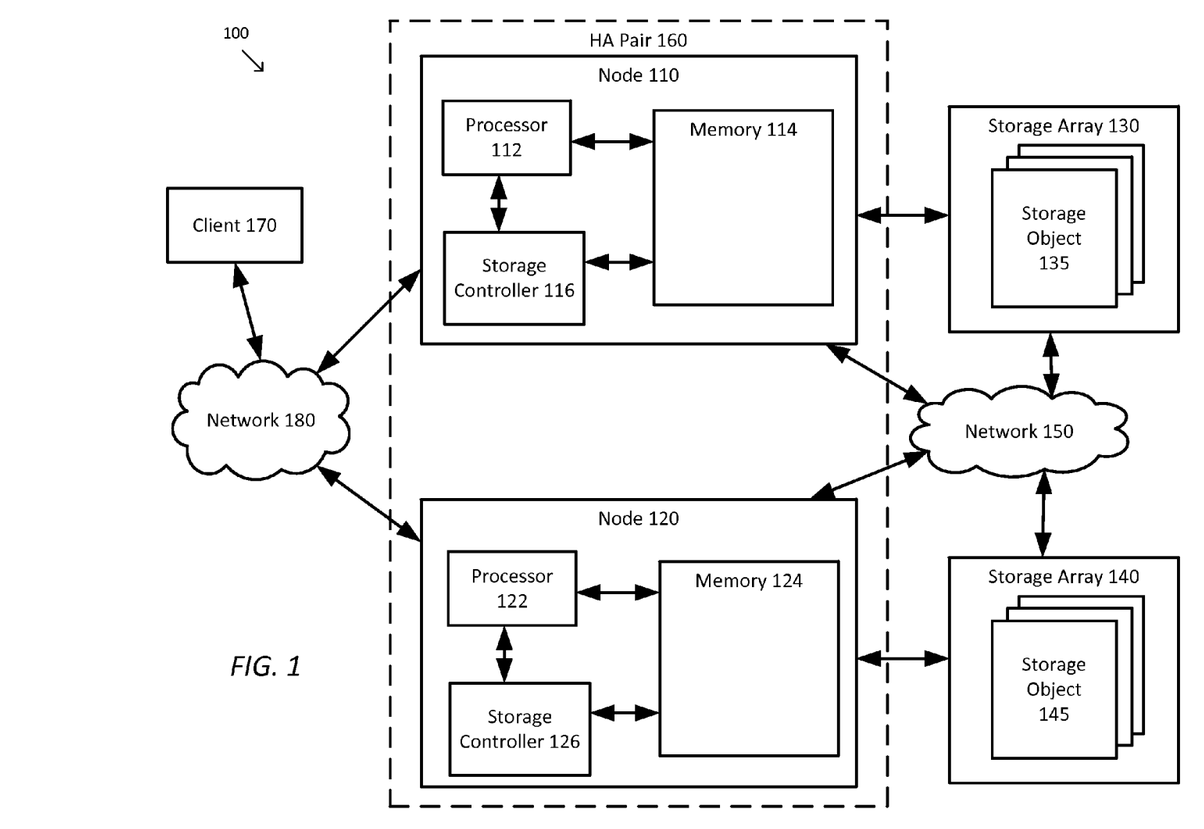
FIG. 1 is a simplified diagram of an example storage system according to some embodiments.

FIG. 1 is a simplified diagram of an example storage system 100 according to some embodiments. Storage system 100 may perform the ownership transfer actions described in more detail below. As shown in FIG. 1, storage system 100 includes two storage servers or nodes 110 and 120. And although FIG. 1 shows storage system 100 with only two nodes, any number of nodes is possible. The general features of nodes 110 and 120 are described below together, but one of ordinary skill would understand that different hardware and/or software may be used in nodes 110 and 120 to implement the hardware and/or software features so described.

Nodes 110 and 120 may be any kind of computing device including a standalone workstation, a cluster, a production server, within a virtual machine, and/or the like. Nodes 110 and 120 include a respective processor 112 or 122 coupled to a respective memory 114 or 124. In some examples, processors 112 and 122 may each control operation and/or execution of hardware and/or software on the respective nodes 110 and 120. Although only one processor 112 or 122 is shown for each of the nodes 110 and 120, nodes 110 and 120 may each include multiple processors, multi-core processors, and/or the like. Each of the memories 114 and 124 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Memories 114 and 124 may be used to store several software packages and systems that are executed by processors 112 and 122, respectively. In some embodiments, nodes 110 and 120 may share memory so that memories 114 and 124 include some overlap.

Nodes 110 and 120 also include storage controllers 116 and 126, respectively. Storage controllers 116 and 126 are generally responsible for managing storage requests received at nodes 110 and 120, respectively, as well as other storage-related tasks. Storage controllers 116 and 126 may each be implemented using software or a combination of hardware and software.

Node 110 is also coupled to at least one storage array 130 that includes one or more storage devices that may be accessed by sending storage requests to node 110. Similarly, node 120 is also coupled to at least one storage array 140 that includes one or more storage devices that may be accessed by sending storage requests to node 120. The one or more storage devices may include one or more types of machine readable media. Some common forms of machine readable media suitable for use in the storage arrays 130 and 140 include floppy disk, flexible disk, hard disk, magnetic tape, any other magnetic medium, CD-ROM, any other optical medium, RAM, PROM, EPROM, FLASH-EPROM, any other memory chip or cartridge, and/or the like.

As part of the management of the respective storage devices and the storage arrays 130 and 140, the storage devices may be organized into one or more aggregates or storage objects, such as the one or more storage objects 135 in storage array 130 and the one or more storage objects 145 in storage array 140. In some examples, home ownership of the storage objects 135 may be assigned to node 110 and/or storage controller 116 and home ownership of the storage objects 145 may be assigned to node 120 and/or storage controller 126.

Nodes 110 and 120 as well as storage arrays 130 and 140 may each be coupled to the other using a network 150. Network 150 may be any kind of computer network including direct links, virtual private networks (VPNs), LANs, such as Ethernets, and/or WANs, such as the Internet. Network 150 may serve several purposes. First, network 150 may be used to support monitoring and management communication, such as a management layer, between node 110 and node 120 as well as between storage controller 116 and storage controller 126. This monitoring and management communication may support one or more protocols that allow the nodes 110 and 120 and the storage controllers 116 and 126 to determine an operational status of each other, exchange data and/or other management information, and/or support the migration in ownership of the storage objects 135 and 145. Network 150 further supports communication between node 110/storage controller 116 and storage array 140 as well as between node 120/storage controller 126 and storage array 130. This communication may be used to allow node 110 and/or storage controller 116 to assume current ownership of any of the storage objects 145 and to allow node 120 and/or storage controller 126 to assume current ownership of the storage objects 135.

Nodes 110 and 120 are further organized into a high-availability (HA) pair 160. The organization of nodes 110 and 120 as HA pair 160 indicates that nodes 110 and 120 and their respective storage controllers 116 and 126 are cooperatively providing redundancy for any storage requests made to storage objects 135 and 145. This may include negotiated migration of any of the storage objects 135 and/or 145 as well as providing proactive monitoring and backup for any storage operations being handled by HA pair 160.

Nodes 110 and 120, as well as HA pair 160, are further coupled to one or more clients 170 using a network 180. Like network 150, network 180 may be any kind of network including a local area network (LAN), such as an Ethernet, or a wide area network (WAN), such as the Internet. In some examples, network 180 may also overlap with network 150. The one or more clients 170 may be hosted on any type of computing device including PCs, laptops, servers, clusters, tablets, mobile devices, virtual machines, and/or the like. The one or more clients 170 may use network 180 to send storage requests to nodes 110 and/or 120. The storage requests may be sent using storage APIs, remote procedure calls, web service requests, and/or the like.

Each of the storage requests may include a storage object identifier that may be used to identify which of the storage objects 135 and/or 145 to which the storage request is directed, but also to determine which of the nodes 110 and/or 120 and their respective storage controllers 116 and/or 126 to which the storage request may be routed. The node and storage controller to which the storage request gets sent depends on which of the nodes 110 and/or 120 and respective storage controller 116 and/or 126 is designated as having current ownership of the storage object corresponding to the storage object identifier. The one or more clients 170 and/or some other device in storage system 100 may maintain one or more data structures and/or databases tracking the current ownership of the storage objects 135 and 145. After receiving the storage request the storage controllers 116 and/or 126 may process the storage request, access the storage object 135 and/or 145 identified in the storage request, and return a result to the client 170 that made the storage request. For example, when node 110 and/or storage controller 116 have current ownership of storage objects 135, a storage request that includes a read request for a file stored in one of the storage objects 135 may be transmitted to node 110, where storage controller 116 makes a corresponding read request to the storage device storing the file, receives the file from the storage device, and then returns the file to client 170.

Although not shown in FIG. 1, nodes 110 and 120 may be part of a larger storage cluster. The cluster may include additional nodes similar to nodes 110 and 120. These additional nodes may also be organized into corresponding HA pairs. According to some embodiments, the nodes may also be organized into different high-availability arrangements. In some examples, the high-availability arrangements may include three or more nodes in a high-availability group with one or more of the nodes in the HA group being able to monitor the other nodes in the HA group and to assume responsibility for the storage objects and/or storage arrays managed by the other nodes in the HA group.

Figure 2:
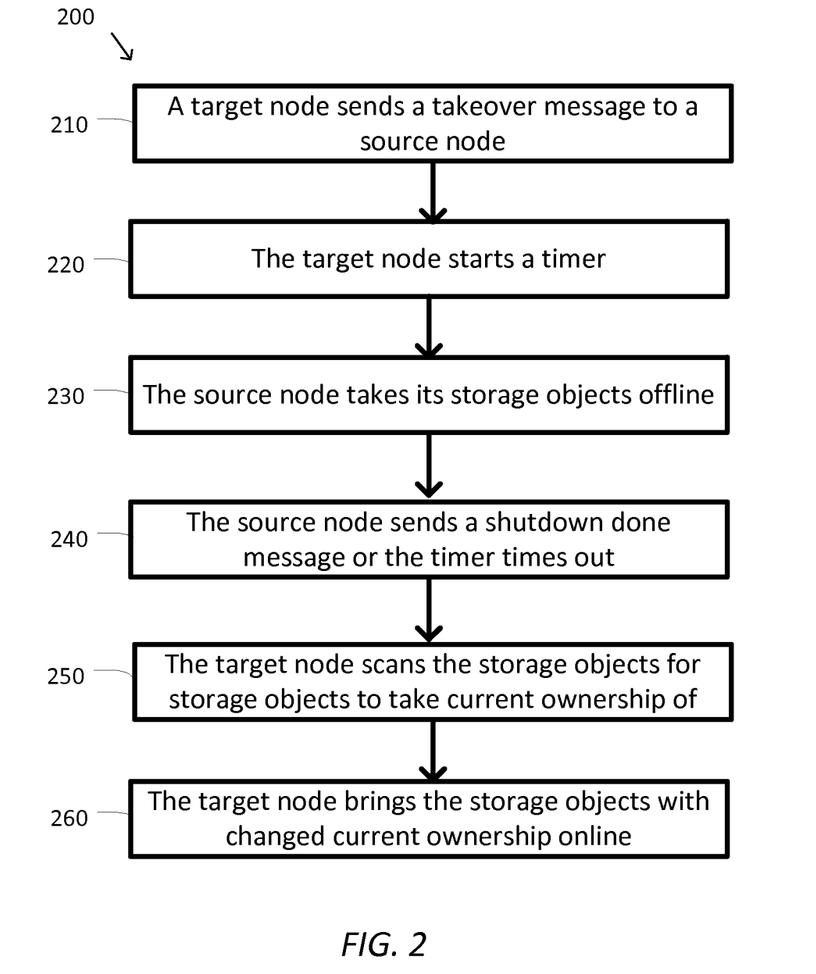
FIG. 2 is a simplified diagram of an example method of negotiated storage object takeover according to some embodiments.

FIG. 2 is a simplified diagram of an example method 200 of negotiated storage object takeover according to some embodiments. One or more of the processes 210-260 of method 200 may be implemented, at least in part, in the form of executable code stored on non-transient, tangible, machine readable media that when run by one or more processors (e.g., the processor 112 and/or 122) may cause the one or more processors to perform one or more of the processes 210-260. For example, method 200 may be implemented by the storage controllers 116 and/or 126.

At a process 210, a target node sends a takeover message to a source node. Negotiated or planned takeover of a source node by a target node may begin with a target storage controller in the target node sending a takeover message to a source storage controller in the source node. The takeover message indicates that the target node is prepared to assume current ownership of any storage objects currently owned by the source node and begin handling storage requests for those storage objects. The takeover message further indicates that the source node is to begin the process of transferring or migrating current ownership of the storage objects it currently owns to the target node. For example, node 110 and its storage controller 116 may be the target node and target storage controller and may use network 150 to send the takeover message to node 120 and its storage controller 126 who become the source node and source storage controller, respectively. As another example, the roles of nodes 110 and 120 and storage controllers 116 and 126 may be reversed with node 120 and storage controller 126 becoming the target node and target storage controller and with node 110 and storage controller 116 becoming the source node and source storage controller. The takeover message may be sent to and received by the source node using any suitable networking protocol, API, remote procedure call, web services request, and/or the like. Process 210 may be initiated as a result of a planned event, such as a scheduled upgrade or other maintenance of the source node. For example, process 210 may be triggered by a user or operator sending a partner takeover command to the target node.

At a process 220, the target node starts a timer. During storage node takeover, the storage objects currently owned by the source node are taken offline. While the storage objects are offline, they are not generally accessible and storage requests directed to the storage objects may not be handled. To place a finite limit on how long the storage objects are offline and to reduce the likelihood that the takeover process will not extend indefinitely, the target node and/or the target storage controller start the timer as a timeout mechanism. The timer may be set to a timeout interval of several times the expected amount of time typically taken for a problem-free negotiated takeover. For example, the timeout interval may be three times longer than the expected negotiated takeover time, so that when the expected negotiated takeover time is 60 seconds, the timeout interval may be set to 180 seconds.

At a process 230, the source node takes its storage objects offline. As a result of receiving the takeover message during process 210, the source node and the source storage controller begin the process of transferring or migrating current ownership of the storage objects currently owned by the source node and the source storage controller by taking these storage objects offline. For example, the source storage controller may iterate through a data structure containing a list of storage objects to identify the storage objects currently owned by the source node and take each of them offline.

At a process 240, the source node sends a shutdown done message or the timer times out. When the negotiated takeover proceeds normally, the source node is able to take its currently owned storage objects offline during process 230 without undue delay. The source node may further handle other shutdown tasks that may or may not be associated with management of its currently owned storage objects. After the source node completes each of these tasks, the source node may send the shutdown done message to the target node. When the target node receives the shutdown done message, it may conclude that the source node has completed its share of the takeover operation and the target node may complete the rest of the takeover operation. The shutdown done message may be sent to and received by the target node using any suitable networking protocol, API, remote procedure call, web services request, and/or the like. When the source node is not able to timely complete its negotiated takeover tasks, the timer started during process 220 may timeout. When the timer times out, the target node may assume that takeover may continue even though the source node has not confirmed completion of its share of the takeover with the shutdown done message.

At a process 250, the target node scans the storage objects for storage objects to take current ownership of To complete the takeover operation, the target node identifies the storage objects that it is assuming responsibility for. This includes those storage objects whose current ownership is still recorded as the source node. This may occur either because process 250 was entered due to the timer timeout during process 240 or because there may be one or more storage objects that the source node may not be able to change ownership of while the source node is still operating. The target node changes the current ownership of each of these storage objects to the target node.

At a process 260, the target node brings the storage objects with changed current ownership online. For each of the storage objects identified as having a current ownership newly assigned to the target node during process 250, the target node brings that storage object online. Once each of the storage objects goes online, it becomes available and the target node and target storage controller may begin handling storage requests for that storage object.

Although not shown in FIG. 2, once the target node has completed the takeover of the source node, a scheduled upgrade and/or other maintenance may be performed on the source node. As part of this upgrade or maintenance the source node may be taken offline or shut down. When the upgrade or maintenance of the source node completes and the source node is able to again handle storage requests, a variation of method 200 may be performed where the takeover is reversed and the current ownership of the storage objects may be returned to the source node. In some examples, the current ownership of the storage objects may be returned by iterating through the data structure of storage objects and changing the current ownership field to the same value as the home ownership field when the home ownership field includes the node identifier associated with the source node.

As described previously, the concurrent transfer of current ownership for many storage objects from the source node to the target node may result in extended periods of time when one or more of the storage objects remains offline. This may occur because each of the storage objects is taken offline by the source node during process 230 before the target node assumes current ownership and begins bringing the storage objects back online during process 260. When the takeover operation of method 200 completes normally, each of the storage objects may be offline for up to a minute or longer. When the takeover operation completes due to timeout of the timer during process 240, the overall offline time may be several times longer. In addition, a potentially large number of storage objects may be offline concurrently, leaving large portions of storage unavailable for use by user and other applications.

According to various embodiments, one approach includes transferring as many of the storage objects as possible one at a time (i.e., serially) during the takeover operation. In this way, most, if not all, of the takeover operation may be completed with one storage object offline at a time. In addition, each one of the storage objects is offline for a shorter period of time, such as 30 seconds or less. This may create less of an overall disruption to the user and other applications as smaller portions of the storage system are unavailable and for shorter periods of time. As a potential disadvantage, the amount of time taken for the takeover operation may be longer as some of the advantages of parallelism in taking the storage objects offline at the same time and bringing them back online may be lost. In many cases, any disadvantage, is outweighed by the lower overall disruption in the use of the storage system.

Figure 3:
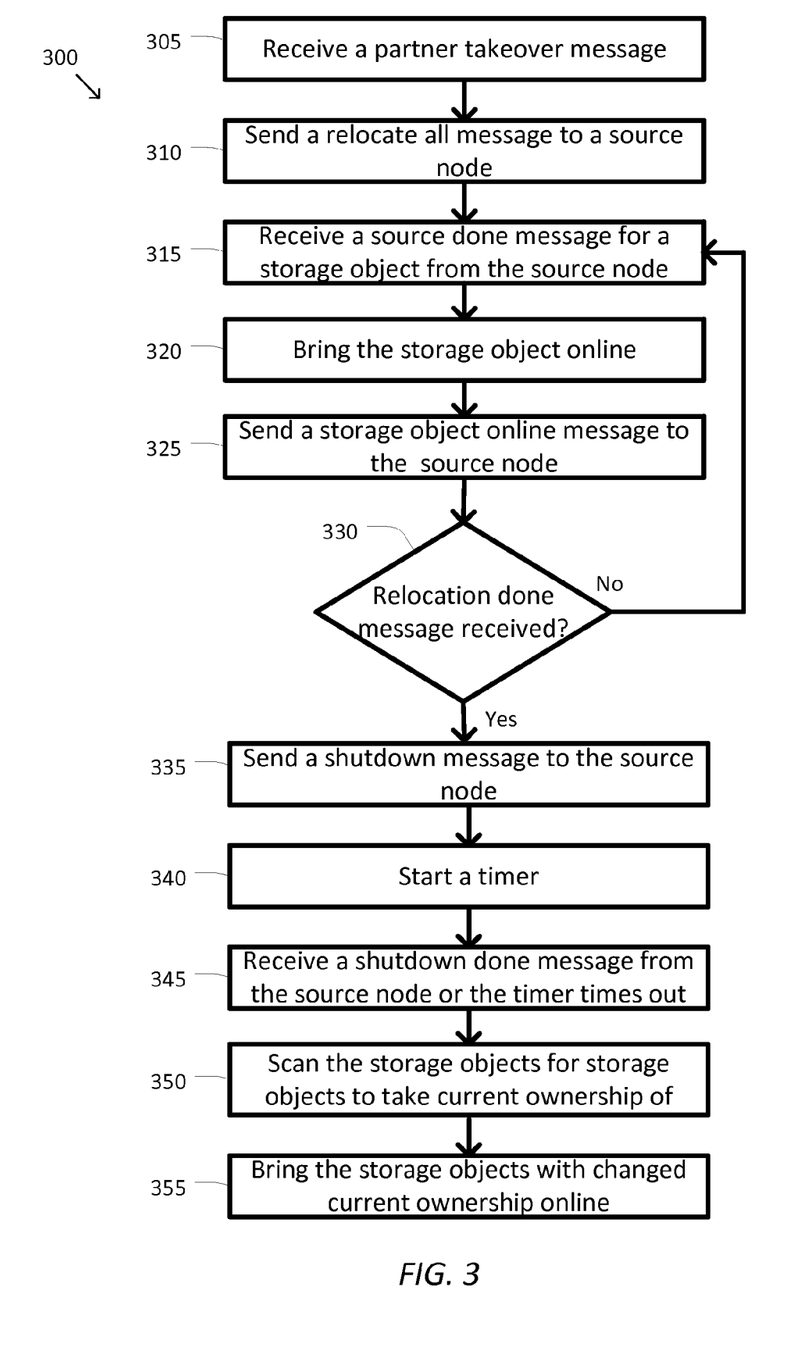
FIG. 3 is a simplified diagram of an example method of negotiated storage object takeover from the perspective of a target node according to some embodiments.
Figure 4:
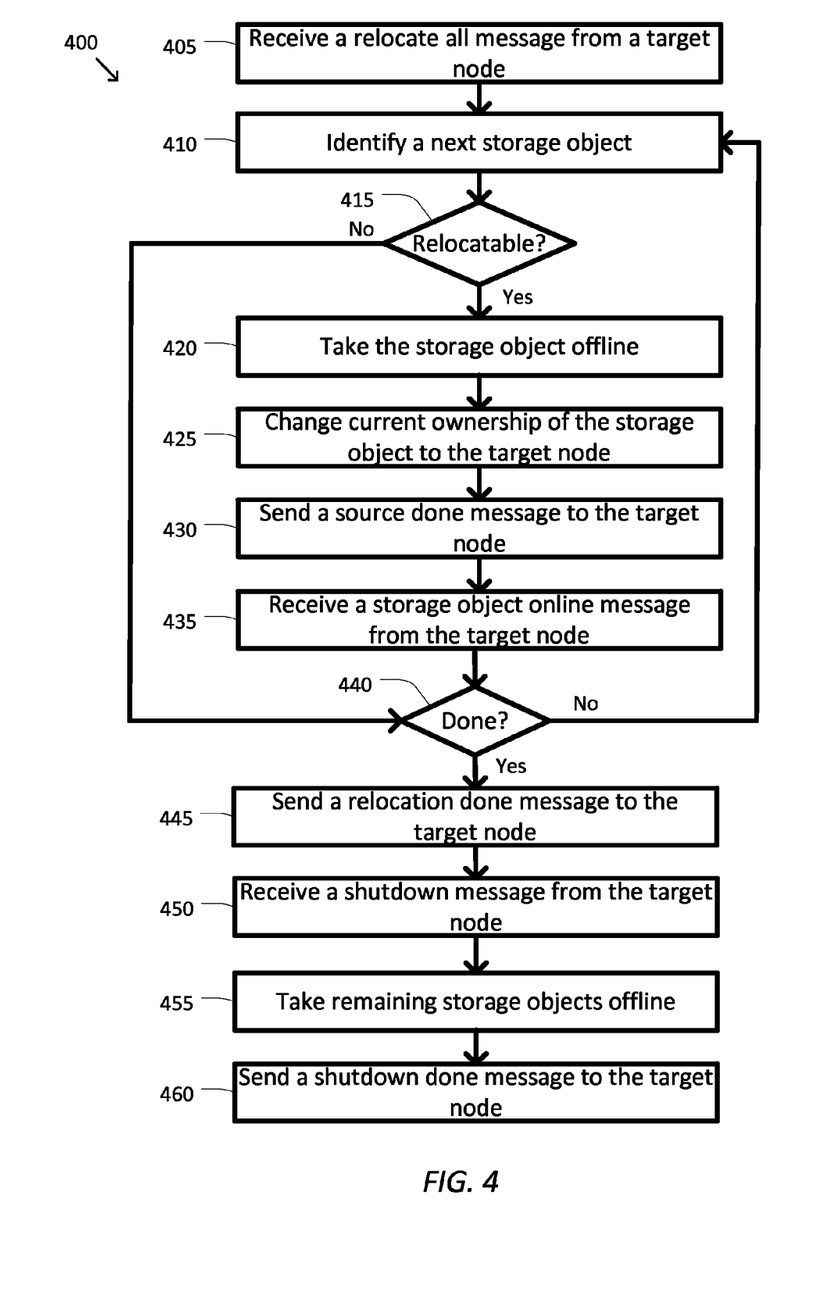
FIG. 4 is a simplified diagram of an example method of negotiated storage object takeover from the perspective of a source node according to some embodiments.

FIGS. 3 and 4, which are described in further detail below, describe one possible example for enhancing method 200 to support both serial and parallel transfer of the current ownership of storage objects during a negotiated takeover operation. The enhanced method generally proceeds in a two phase manner. In a first or serial phase, as many of the storage objects as possible have their current ownership transferred from the source node to the target node. In a follow up second or parallel phase, the current ownership of any remaining storage objects are transferred from the source node to the target node using a method similar to method 200. Selection of the storage objects for serial transfer during the first phase and for parallel transfer during the parallel second phase may generally be determined based on the type of information stored in the storage object.

When storage objects in a storage system are managed using a storage server, such as storage server 110 and/or 120, and/or a storage controller, such as storage controller 116 and/or 126, the storage objects may generally fall into one of two categories based on the type of data stored in them. The first category of storage objects generally includes storage objects that store user-related data. This may include user data used by user and other applications, but may also include metadata associated with the user data. In some storage systems, the storage objects in this first category may be referred to as storage failover (SFO) storage objects because they may generally be transferred or migrated without interfering with the operation of a storage controller. In general, most of the SFO storage objects may be transferred serially during the serial phase of a takeover operation. In contrast, the second category of storage objects generally includes storage objects that store data more tightly related to the operation of the storage controller and/or the storage server. These storage objects may typically include the root storage object for the storage server as well as other storage objects storing configuration data associated with the storage server and storage controller, related logs, and/or the like. In some storage systems, the storage objects in the second category may be referred to as controller failover (CFO) storage objects because they may not generally be transferrable unless they are no longer being used by the storage controller and/or the storage server. In general, the CFO storage objects may not be transferred serially during the first phase of a takeover operation and are typically transferred during the parallel second phase.

FIG. 3 is a simplified diagram of an example method 300 of negotiated storage object takeover from the perspective of a target node according to some embodiments. One or more of the processes 305-355 of method 300 may be implemented, at least in part, in the form of executable code stored on non-transient, tangible, machine readable media that when run by one or more processors (e.g., the processor 112 and/or 122) may cause the one or more processors to perform one or more of the processes 305-355. For example, method 300 may be implemented by the storage controllers 116 and/or 126 when they are operating as the target node of a negotiated takeover.

At a process 305, a partner takeover message is received. When a planned or negotiated takeover is desired, such as to handle a scheduled upgrade or some other maintenance of a source node in a HA pair, a user or operator may send the partner takeover message, which may be eventually be received by a target node. The partner takeover message instructs the target node to begin a negotiated takeover of the storage responsibilities of the source node, where the target node and the source node are partner nodes in the HA pair. For example, the user or operator at client 170 may send the partner takeover message to node 110 so that node 110 may assume the storage responsibilities for node 120. When this happens, node 110 becomes the target node and node 120 becomes the source node. In another example, the user or operator could send the partner takeover message to node 120 making node 120 the target node and node 110 the source node. The partner takeover message may be sent to and received by the target node using any suitable networking protocol, API, remote procedure call, web services request, and/or the like.

At a process 310, a relocate all message is sent to the source node. Upon receiving the partner takeover message during process 305, the target node enters the serial first phase of the takeover operation and sends the relocate all message to the source node. The relocate all message asks the source node to begin transferring current ownership of as many of its storage objects as possible from the source node to the target node. In some examples, each of the storage objects transferred during the serial first phase are SFO storage objects. After sending the relocate all message to the source node, the target node may enter a loop where the target node waits for notification of when the target node may assume current ownership of each of the storage objects. The relocate all message may be sent to the source node using any suitable networking protocol, API, remote procedure call, web services request, and/or the like.

At a process 315, a source done message for a storage object may be received from the source node. After the source node completes its processing to transfer current ownership of the storage object to the target node, it may signal to the target node that the target node may assume ownership of the storage object by sending the source done message to the target node. The source done message may include an identifier associated with the storage object whose current ownership is being transferred. In some examples, the storage object identifier may be a logical unit number (LUN). The source done message may be sent to and received by the target node using any suitable networking protocol, API, remote procedure call, web services request, and/or the like.

At a process 320, the storage object is brought online. The target node brings the storage object associated with the source done message received during process 315 back online. For example, the storage object may be brought online by adding the storage object identifier of the storage object to one or more data structures that indicate that the target node is now able to handle storage requests for the storage object. By bringing the storage object online, the target node assumes current ownership of the storage object. The storage object is now available and may be the subject of storage requests received by the target node.

At a process 325, a storage object online message is sent to the source node. After the target node brings the storage object online and takes over handling of storage requests for the storage object, the target node may confirm this by sending the storage object online message to the source node. The storage object online message may include the same storage object identifier included in the source done message received during process 315. The storage object online message may be sent to the source node using any suitable networking protocol, API, remote procedure call, web services request, and/or the like.

At a process 330, it is determined whether a relocation done message is received from the source node. The serial first phase of the takeover operation continues with the processing of one storage object at a time. This continues until the source node signals that there are no more storage objects that may be serially taken over by sending the relocation done message to the target node. The relocation done message may be sent to and received by the target node using any suitable networking protocol, API, remote procedure call, web services request, and/or the like. Until the relocation done message is received by the target node, the target node continues to iterate through processes 315, 320, and 325 as current ownership of storage objects is transferred one by one to the target node. When the relocation done message is received by the target node, the takeover operation switches to the parallel second phase beginning with process 335.

At the process 335, a shutdown message is sent to the source node. The shutdown message indicates to the source node that it is to begin the steps to transfer current ownership of any of its remaining storage objects to the target node and begin any other shutdown operations. The shutdown message may be sent to the source node using any suitable networking protocol, API, remote procedure call, web services request, and/or the like.

At a process 340, a timer is started. To place a finite limit on how long the parallel second phase of the takeover operation takes, a timer is started in the target node. The timer may be set to a timeout interval of several times the expected amount of time typically taken for a problem-free parallel second phase of the takeover operation. For example, the timeout interval may be three times longer than the expected parallel second phase time, so that when the expected parallel second phase time is 60 seconds, the timeout interval may be set to 180 seconds.

At a process 345, a shutdown done message is received from the source node or the timer times out. When the parallel second phase of the takeover operation proceeds normally, the source node is able to take its remaining storage objects offline without undue delay. The source node may further handle other shutdown tasks that may or may not be associated with management of its currently owned storage objects. After the source node completes each of these tasks, the source node may send the shutdown done message to the target node. When the target node receives the shutdown done message, it may conclude that the source node has completed its share of the parallel second phase of the takeover operation and the target node may complete the rest of the takeover operation. The shutdown done message may be sent to and received by the target node using any suitable networking protocol, API, remote procedure call, web services request, and/or the like. When the source node is not able to timely complete its portion of the parallel second phase of the takeover operation, the timer started during process 340 may timeout. When the timer times out, the target node may assume that the parallel second phase of the takeover may continue even though the source node has not confirmed completion of its share of the parallel second phase by sending the shutdown done message.

At a process 350, the storage objects are scanned for storage objects to take current ownership of. To complete the parallel second phase of the takeover process, the target node identifies any additional storage objects that it is assuming responsibility for that were not transferred serially during the serial first phase of the takeover operation (processes 315, 320, and 325). These storage objects may include the CFO storage objects of the source node and any of the SFO storage objects that could not be transferred serially during the serial first phase of the takeover operation. The target node may identify the additional storage objects during the scan by looking for storage objects whose current ownership is still recorded as the source node. The target node changes the current ownership of each of these storage objects from the source node to the target node.

At a process 355, the target node brings the storage objects with changed current ownership online. For each of the storage objects identified as having a current ownership newly assigned to the target node during process 350, the target node brings that storage object online. For example, each of the storage objects may be brought online by adding the storage object identifier associated with each of the storage objects to one or more data structures that indicate that the target node is now able to handle storage requests for the storage objects. Once each of the storage objects goes online, it becomes available and the target node and target storage controller may begin handling storage requests for that storage object. With the completion of process 355, the parallel second phase of the takeover operation is complete and each of the storage objects whose current ownership was previously assigned to the source node are now transferred to the target node.

FIG. 4 is a simplified diagram of an example method 400 of negotiated storage object takeover from the perspective of a source node according to some embodiments. One or more of the processes 405-460 of method 400 may be implemented, at least in part, in the form of executable code stored on non-transient, tangible, machine readable media that when run by one or more processors (e.g., the processor 112 and/or 122) may cause the one or more processors to perform one or more of the processes 405-460. For example, method 400 may be implemented by the storage controllers 116 and/or 126 when they are operating as the source node of a negotiated takeover.

At a process 405, a relocate all message is received from a target node. The relocate all message may correspond to the relocate all message sent by the target node during process 310. Upon receipt of the relocate all message, the source node knows that it is to transfer current ownership and responsibility for its storage objects to the target node. More specifically, the relocate all message may cause the source node to enter the serial first phase of a takeover operation. In the serial first phase of the takeover operation, the source node begins transferring current ownership of as many of its storage objects as possible to the target node. In some examples, each of the storage objects transferred during the serial first phase are SFO storage objects. After receiving the relocate all message, the source node enters a loop where the source node transfers current ownership of its storage objects one at a time. In some examples, the relocate all message may be examined to determine an identifier associated with the target node. The relocate all message may be sent to and received by the source node using any suitable networking protocol, API, remote procedure call, web services request, and/or the like.

At a process 410, a next storage object is identified. To serially transfer current ownership of its storage objects to the target node, the source node iterates through each of its storage objects in turn. In some examples, the source node may identify the next storage object by traversing through a data structure listing the storage objects currently owned by the source node.

At a process 415, it is determined whether the storage object is relocatable. Status, information, and/or metadata associated with the storage object identified during process 410 are examined to determine whether the current ownership of the storage object may be transferred to the target node at this time. For example, the storage system and/or the storage array where the storage object is stored may temporarily prevent transfer of the current ownership due to a currently pending or ongoing storage operation. When the storage object is not currently relocatable, it is determined whether there are additional storage objects that may be transferred during the serial first phase using a process 440. When the storage object is currently relocatable, the current ownership of the storage object is transferred to the target node beginning with a process 420.

At the process 420, the storage object is taken offline. The storage object identified during process 410 is taken offline so that its current ownership may be transferred to the target node. For example, the storage object may be taken offline by waiting for any pending storage request for the storage object to complete and then removing the storage object identifier of the storage object from one or more data structures to indicate that the source node is no longer able to handle storage requests for the storage object. While the storage object is offline, it may not be available for storage operations.

At a process 425, current ownership of the storage object is changed to the target node. The current ownership of the storage object taken offline during process 420 is changed to the target node. For example, the source storage controller may locate an entry in a data structure containing the list of storage objects currently owned by the source node and change a current ownership field or value. The current ownership field may be changed from an identifier associated with the source node to the identifier associated with the target node determined during process 405. In some examples, a home ownership field or value for the storage object may be left unchanged so that the current ownership of the storage object may be returned to the source node at a later time.

At a process 430, a source done message is sent to the target node. After the current ownership of the storage object is changed to the target node during process 425, the source node may notify the target node that the target node may assume current ownership and responsibility for the storage object. The source node may do this by sending the source done message to the target node. The source done message may include an identifier associated with the storage object whose current ownership is being transferred. In some examples, the storage object identifier may be a LUN. The source done message may be sent to the target node using any suitable networking protocol, API, remote procedure call, web services request, and/or the like. The source done message may correspond to the source done message received by the target node during process 315.

At a process 435, a storage object online message is received from the source node. After the target node takes over responsibility for the storage object, the target node may confirm this by sending the storage object online message to the source node. The storage object online message may include the same storage object identifier included in the source done message sent during process 430. The storage object online message may be sent to and received by the source node using any suitable networking protocol, API, remote procedure call, web services request, and/or the like. The storage object online message received may correspond to the storage object online message sent by the target node during process 325.

At the process 440, it is determined whether the current ownership of any additional storage objects may be transferred during the serial first phase. In some examples, the source node may determine whether there are any additional storage objects in the data structure used to identify the next storage object during process 410. When there are additional storage objects whose current ownership may be transferred to the target node during the serial first phase of the takeover operation, the next storage object to transfer is identified using process 410. When there are no additional storage objects, the source node switches to the parallel second phase of the takeover operation beginning with a process 445.

At a process 445, a relocation done message is sent to the target node. The source node may indicate its completion of the serial first phase of the takeover operation by sending the relocation done message to the target node. The relocation done message indicates to the target node that the serial first phase of the takeover operation is complete and that there are no more storage objects whose current ownership may be transferred serially. The relocation done message may be sent to the target node using any suitable networking protocol, API, remote procedure call, web services request, and/or the like. The relocation done message sent may correspond to the relocation done message received by the target node during process 330.

At a process 450, a shutdown message is received from the target node. The shutdown message indicates to the source node that the target node has entered the parallel second phase of the takeover operation, and the source node may begin the steps to transfer current ownership of any of its remaining storage objects to the target node as well as any other shutdown operations. The shutdown message may be sent to and received by the source node using any suitable networking protocol, API, remote procedure call, web services request, and/or the like. The shutdown message received may correspond to the shutdown message sent by the target node during process 335.

At a process 455, the remaining storage objects are taken offline. As a result of receiving the shutdown message during process 450, the source node begins the process of transferring current ownership of any remaining storage objects currently owned by the source node by taking these storage objects offline. These remaining storage objects may include any of the storage objects that were not transferred serially during the serial first phase of the takeover operation (processes 410-435) as well as any CFO storage objects currently owned by the source node. For example, the source storage controller may iterate through the data structure containing the list of storage objects currently owned by the source node and take each of them offline. In some examples, the source storage controller may also wait for any pending storage request for the storage objects to complete and then remove the storage object identifier for each of the storage objects from one or more data structures to indicate that the source node is no longer able to handle storage requests for the storage objects.

At a process 460, a shutdown done message is sent to the target node. When the ownership of the remaining storage objects are taken offline and any other relevant shutdown tasks are completed, the source node indicates that it has completed the parallel second phase of the takeover operation by sending the shutdown message to the target node. The relocation done message may be sent to the target node using any suitable networking protocol, API, remote procedure call, web services request, and/or the like. The shutdown done message sent may correspond to the shutdown done message received by the target node during process 345.

The scope of embodiments of methods 300 and/or 400 is not limited to the arrangement of processes as shown in FIGS. 3 and 4. According to certain embodiments process 415 may more flexibly be able to handle storage objects that are not currently relocatable. In some examples, the data structure used by the source node to iterate through the storage objects may include properties of a first-in-first-out (FIFO) queue. When the source node determines that a storage object is not currently relocatable, it may move the storage object to the end of the queue where its relocatability may be retried later. In some examples, the number of retries for any given storage object may be limited to one, two, or more retries. In some examples, when a SFO storage object is not relocatable, this may abort the takeover operation, which the source node may communicate to the target node using a suitable message.

According to certain embodiments, the relocation may include transferring current ownership from the source node to more than one node in a high availability group. In some examples, processes 425, 430, and 435 may be adapted so that the current ownership is transferred to any of the other nodes in the high availability group. The other node selected becomes the node that receives the source done message and brings the storage object online. In some examples, portions of processes 350 and/or 355 may be delegated to one or more other nodes in the high availability group, which may assume current ownership of at least some of the remaining storage objects.

According to certain embodiments, additional timers may be used in the source node and/or the target node. In some examples, the source node may start a timer during process 430 after sending the source done message. When this timer times out before the storage object online message is received during process 435, the source node may resend the source done message one or more times or abort the takeover operation. In some examples, the target node may start a timer after sending the relocate all message during process 310. In some examples, the timer may be cleared when a source done message is received during process 315 or a relocation done message is received during process 330. The target node may then restart the timer after sending each storage object online message. In some examples, the timer may be retriggerable with the timeout period being reset with each source done message being received during process 315 and cleared when the relocation done message is received during process 330. When this timer times out without receiving a source done or a relocation done message, the target node may skip ahead to process 335 and begin the parallel second phase or abort the takeover operation.

According to certain embodiments, one or more of the messages may be omitted and/or modified. In some examples, the storage online message sent during process 325 and received during process 435 may be omitted. Instead, the source node may monitor the status of the storage object being transferred to determine whether it is back online as a result of process 320. In some examples, the shutdown message sent during process 335 and received during process 445 may be omitted with both the source node and the target node switching to the parallel second phase of the takeover operation in response to the relocation done message sent during process 445 and received during process 330.

According to certain embodiments, the takeover operation may be aborted in the source node and/or the target node under varying circumstances. In some examples, the user or operator may manually abort the takeover operation by sending a suitable message to the target node and/or the source node. In some examples, when the source node enters a failure or panic state, the target node would switch the takeover operation to an unplanned emergency takeover operation where the target node would automatically take current ownership of the storage objects currently owned by the source node. In some examples, when the target node enters a failure or panic state, the source node would switch the takeover operation to an unplanned emergency takeover operation of the target node where the source node would automatically take current ownership of the storage objects currently owned by the target node, including any storage objects whose current ownership had been transferred to the target node as part of the negotiated takeover operation just aborted.

According to certain embodiments, the processes of methods 300 and 400 may be used for other purposes. In some examples, a variation of the negotiated takeover may be used as part of a giveback operation where the storage objects whose current ownership was transferred as part of a previous negotiated takeover may be returned back to their home owner. In some examples, any node and storage controller may support both methods 300 and 400 by practicing one or the other depending on whether the node is a source node or a target node. In some examples, a node may be part of more than one HA pair and may be able to act as the target node for more than one source node concurrently.

Some examples of nodes 110 and/or 120 may include non-transient, tangible, machine readable media that include executable code that when run by one or more processors may cause the one or more processors (e.g., the processors 112 and/or 122) to perform the processes of methods 200, 300, and/or 400 as described above. Some common forms of machine readable media that may include the processes of methods 200, 300, and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features.

One of ordinary skill in the art would recognize many variations, alternatives, and modifications. Thus, the scope should be limited only by the following claims, and it is appropriate that the claims be construed broadly and in a manner consistent with the scope of the embodiments disclosed herein.

What is claimed is:

1. A target storage server comprising:
   memory containing machine readable medium comprising machine executable code having stored thereon instructions for storage object management and storing a data structure including information about a plurality of storage objects; and
   a processor coupled to the memory, the processor configured to execute the machine executable code to cause the processor to:
      send a takeover message to a source storage server, detect a particular storage object from a first subset of the storage objects that is currently owned by the source storage server and whose ownership can be assumed based on the data structure, bring the particular storage object online, and iteratively detect and bring online additional of the first subset of the storage objects until the source storage server indicates that there are no more storage objects within the first subset of the storage objects to be taken over; and
      assume, concurrently, current ownership of a second subset of the storage objects, wherein the second subset of the storage objects is currently owned by the source storage server.

2. The target storage server of claim 1 wherein the processor is further configured to execute the machine executable code to receive a source done message from the source storage server to detect the particular storage object, the source done message including an identifier associated with the particular storage object.

3. The target storage server of claim 1 wherein the processor is further configured to execute the machine executable code to receive a relocation done message from the source storage server to indicate that there are no more storage objects within the first subset of the storage objects to be taken over.

4. The target storage server of claim 1 wherein the processor is further configured to execute the machine executable code to send a storage object online message to the source storage server after bringing the particular storage object online, the storage object online message including an identifier associated with the particular storage object.

5. The target storage server of claim 1 wherein the processor is further configured to execute the machine executable code to:
   send a shutdown message to the source storage server;
   receive a shutdown done message from the source storage server;
   detect the second subset of the storage objects by scanning the data structure of storage objects;
   change current ownership of the second subset of the storage objects; and
   bring each storage object in the second subset of the storage objects online.

6. The target storage server of claim 5 wherein the processor is further configured to execute the machine executable code to:
   start a timer after sending the shutdown message; and
   detect the second subset of the storage objects when the timer times out.

7. A non-transitory machine readable medium having stored thereon instructions for performing a method comprising machine executable code which when executed by a target storage server, causes the target storage server to:
   send a takeover message to a source storage server, detect a particular storage object from a first subset of a plurality of storage objects that is currently owned by the source storage server and whose ownership can be assumed based on a data structure including information about the storage objects, bring the particular storage object online, and iteratively detect and bring online additional of the first subset of the storage objects until the source storage server indicates that there are no more storage objects within the first subset of the storage objects to be taken over; and
   assume, concurrently, current ownership of a second subset of the storage objects, wherein the second subset of the storage objects is currently owned by the source storage server.

8. The non-transitory machine readable medium of claim 7, wherein the machine executable code when executed by the target storage server further causes the target storage server to receive a source done message from the source storage server to detect the particular storage object, the source done message including an identifier associated with the particular storage object.

9. The non-transitory machine readable medium of claim 7, wherein the machine executable code when executed by the target storage server further causes the target storage server to receive a relocation done message from the source storage server to indicate that there are no more storage objects within the first subset of the storage objects to be taken over.

10. The non-transitory machine readable medium of claim 7, wherein the machine executable code when executed by the target storage server further causes the target storage server to send a storage object online message to the source storage server after bringing the particular storage object online, the storage object online message including an identifier associated with the particular storage object.

11. The non-transitory machine readable medium of claim 7, wherein the machine executable code when executed by the target storage server further causes the target storage server to:
   send a shutdown message to the source storage server;
   receive a shutdown done message from the source storage server;
   detect the second subset of the storage objects by scanning the data structure of storage objects;
   change current ownership of the second subset of the storage objects; and
   bring each storage object in the second subset of the storage objects online.

12. The non-transitory machine readable medium of claim 11, wherein the machine executable code when executed by the target storage server further causes the target storage server to:
   start a timer after sending the shutdown message; and
   detect the second subset of the storage objects when the timer times out.

13. A method, comprising:
   sending, by a target storage server, a takeover message to a source storage server, detecting a particular storage object from a first subset of a plurality of storage objects that is currently owned by the source storage server and whose ownership can be assumed based on a data structure including information about the storage objects, bringing the particular storage object online, and iteratively detecting and bringing online additional of the first subset of the storage objects until the source storage server indicates that there are no more storage objects within the first subset of the storage objects to be taken over; and assuming, concurrently and by the target storage server, current ownership of a second subset of the storage objects, wherein the second subset of the storage objects is currently owned by the source storage server.

14. The method of claim 13, further comprising receiving, by the target storage server, a source done message from the source storage server to detect the particular storage object, the source done message including an identifier associated with the particular storage object.

15. The method of claim 13, further comprising receiving, by the target storage server, a relocation done message from the source storage server to indicate that there are no more storage objects within the first subset of the storage objects to be taken over.

16. The method of claim 13, further comprising sending, by the target storage server, a storage object online message to the source storage server after bringing the particular storage object online, the storage object online message including an identifier associated with the particular storage object.

17. The method of claim 13, further comprising:
sending, by the target storage server, a shutdown message to the source storage server;
receive, by the target storage server, a shutdown done message from the source storage server;
detecting, by the target storage server, the second subset of the storage objects by scanning the data structure of storage objects;
changing, by the target storage server, current ownership of the second subset of the storage objects; and
bringing, by the target storage server, each storage object in the second subset of the storage objects online.

18. The method of claim 17, further comprising:
starting, by the target storage server, a timer after sending the shutdown message; and
detecting, by the target storage server, the second subset of the storage objects when the timer times out.

* * * * *